(12) United States Patent
West

(10) Patent No.: US 11,248,579 B2
(45) Date of Patent: Feb. 15, 2022

(54) BOOSTER ASSEMBLY AND APPARATUS

(71) Applicant: BRADDELL LIMITED, Douglas (GB)

(72) Inventor: Stephen Mark West, Dalkeith (AU)

(73) Assignee: BRADDELL LIMITED, Douglas (GB)

( * ) Notice: Subject to any disclaimer, the term of this patent is extended or adjusted under 35 U.S.C. 154(b) by 128 days.

(21) Appl. No.: 16/303,509

(22) PCT Filed: May 22, 2017

(86) PCT No.: PCT/AU2017/050480
§ 371 (c)(1),
(2) Date: Nov. 20, 2018

(87) PCT Pub. No.: WO2017/197470
PCT Pub. Date: Nov. 23, 2017

(65) Prior Publication Data
US 2020/0325870 A1    Oct. 15, 2020

(30) Foreign Application Priority Data
May 20, 2016    (AU) .................................. 2016901922

(51) Int. Cl.
*F03B 13/10* (2006.01)
*F03B 3/04* (2006.01)
*F04F 1/18* (2006.01)

(52) U.S. Cl.
CPC .............. *F03B 13/10* (2013.01); *F03B 3/04* (2013.01); *F04F 1/18* (2013.01); *F05B 2210/18* (2013.01); *F05B 2220/20* (2013.01); *F05B 2240/133* (2013.01)

(58) Field of Classification Search
CPC .... F03B 13/10; B03B 3/04; F04F 1/18; F05B 2210/18; F05B 2220/20; F05B 2240/133
See application file for complete search history.

(56) References Cited

U.S. PATENT DOCUMENTS

| | | | |
|---|---|---|---|
| 1,904,320 A * | 4/1933 | Marples | F04D 15/0022 137/565.35 |
| 4,792,284 A * | 12/1988 | Straub | B01D 61/10 417/77 |
| 2008/0173363 A1 * | 7/2008 | Betting | F15C 1/16 137/625.28 |

* cited by examiner

Primary Examiner — Sean Gugger
(74) Attorney, Agent, or Firm — Harness, Dickey & Pierce, P.L.C.

(57) ABSTRACT

The present invention provides a booster apparatus (10) for entraining gas in a flowing second fluid. The booster apparatus comprises a booster housing (116) for receiving a fluid. The booster apparatus has at least one inlet (123) through which a first fluid passes to be entrained in the second fluid when the second fluid is flowing through the booster housing. The present invention also provides a booster assembly (12) comprising a booster apparatus (10) and a fluid motive mechanism such as a turbine unit (11).

18 Claims, 12 Drawing Sheets

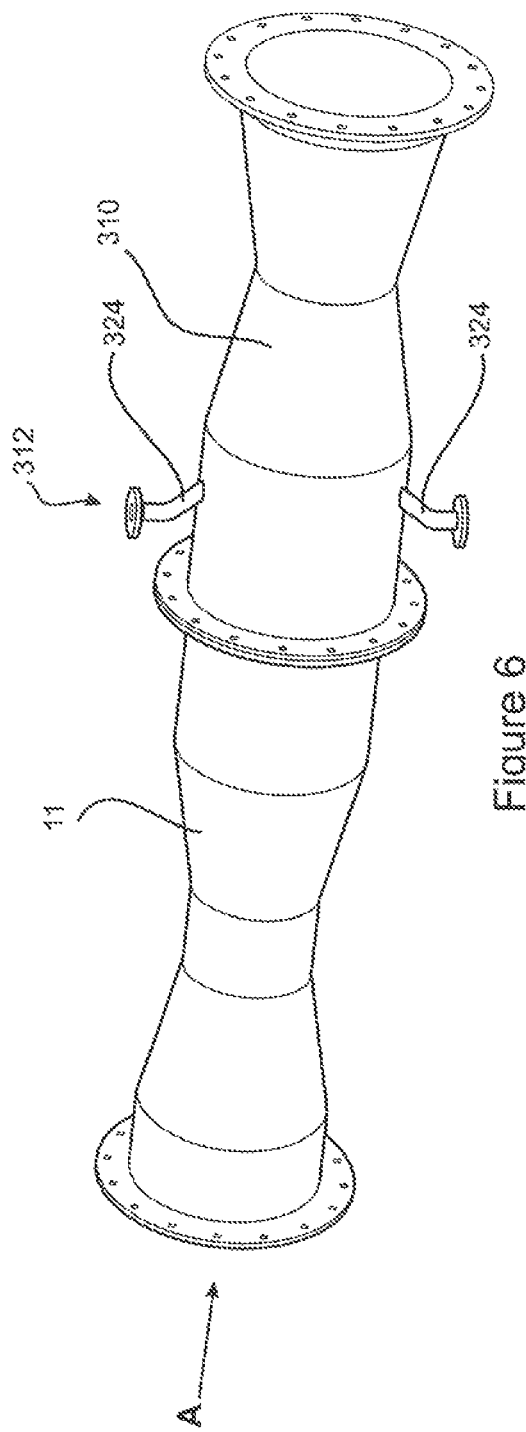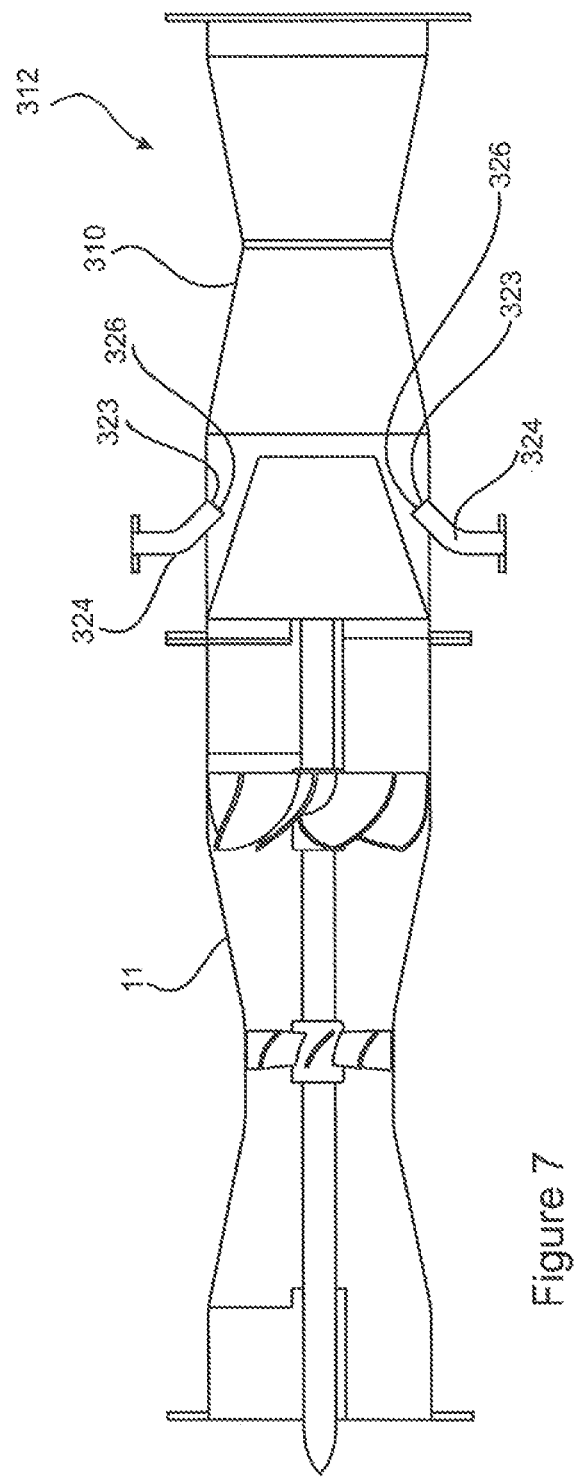
Figure 6
Figure 7

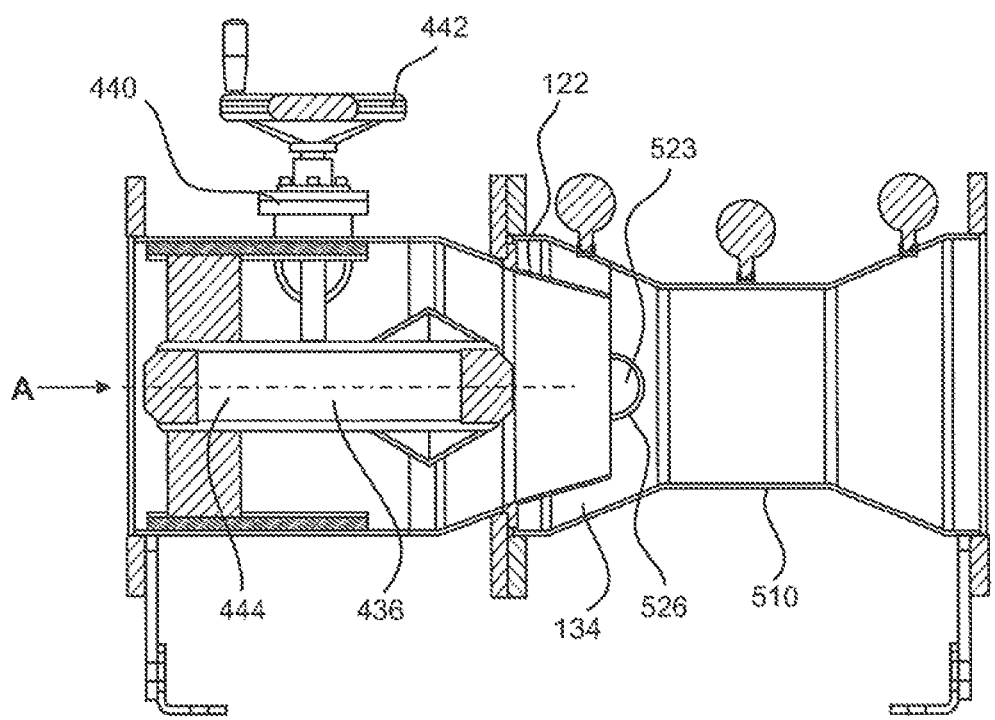
Figure 16
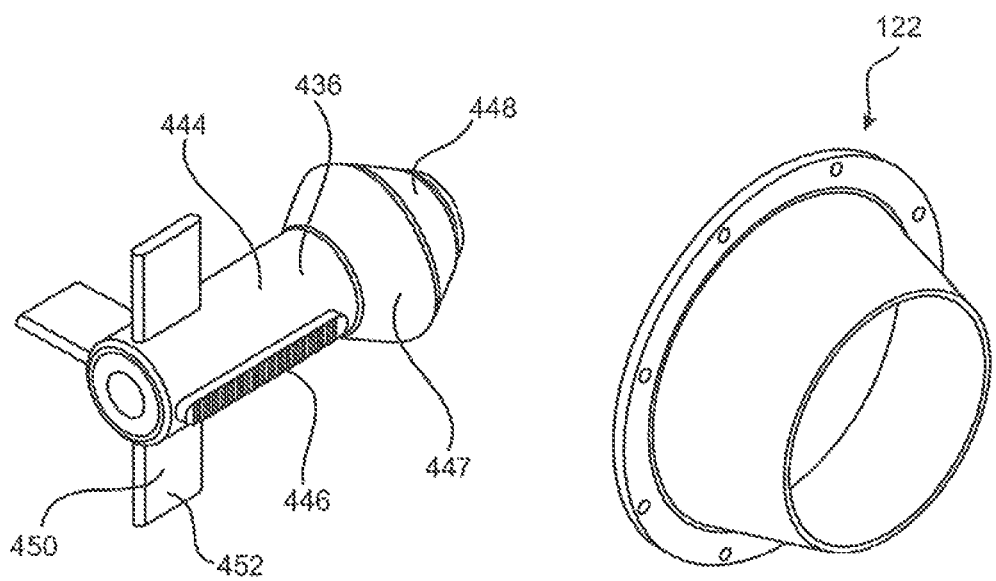
Figure 17
Figure 18

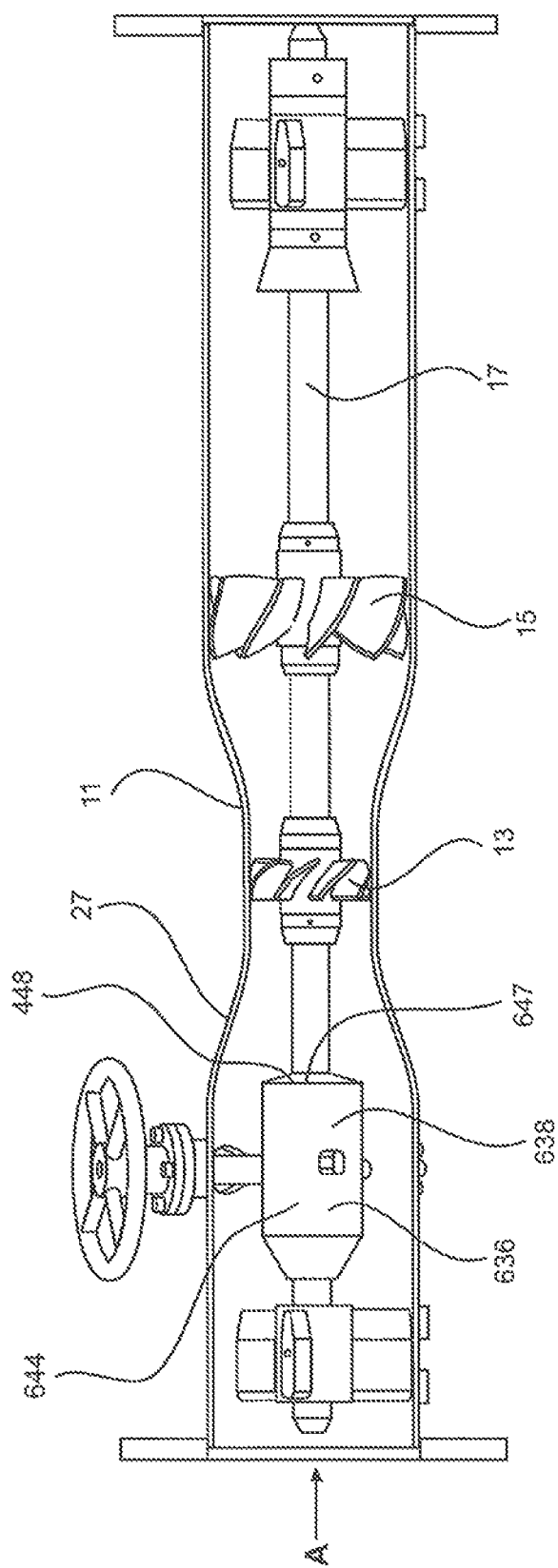

BOOSTER ASSEMBLY AND APPARATUS

CROSS-REFERENCE TO RELATED APPLICATIONS

This application is a 371 U.S. National Stage of International Application No. PCT/AU2017/050480, filed May 22, 2017. This application claims priority to Australian Patent Application No. 2016901922, filed May 20, 2016. The disclosures of the above applications are incorporated herein by reference.

FIELD OF THE INVENTION

The present invention generally relates to a booster assembly and booster apparatus. In particular the invention relates to a booster assembly and booster apparatus for assisting the transportation of a fluid, particularly when the fluid is required to be lifted to an elevated position.

BACKGROUND ART

Water is critical to most aspects of society. It is therefore important that water is made readily available. In order to achieve this substantial infrastructure is required to transport water from a reservoir, such as a dam, to an outlet, such as a tap. The infrastructure typically comprises numerous pumps to pump the water through pipelines from one location to another.

The cost associated with transporting water is significant, particularly if water needs to be transported over significant distances, and/or over elevated obstacles, such as mountains, where the pressure head must be overcome. This cost increases substantially with every metre of head that water is required to overcome and is a constant cost regardless if the water is required to be transported for human consumption directly, for irrigation, pumped to head distribution reservoirs, for dewatering mines, and other water conveyance systems. This cost includes that attributable to infrastructure, but more significantly, the cost associated with providing the requisite power to operate the pumps for transporting the water through the pipeline.

Furthermore, the power required to run the pumps has a direct impact on the environment. The cost in terms of carbon emissions associated with production of the power will continue to increase, at least in developed countries. Also increased power requirements translate to increased carbon production which negatively affects the earth's atmosphere. As the demand on earth's diminishing fossil fuels increases, there is a greater focus on developing more efficient ways to utilise power.

The preceding discussion of the background to the invention is intended only to facilitate an understanding of the present invention. It should be appreciated that the discussion is not an acknowledgment or admission that any of the material referred to was part of the common general knowledge as at the priority date of the application.

DISCLOSURE OF THE INVENTION

It is an object of this invention to provide a booster assembly and booster apparatus which ameliorates or overcomes one or more of the disadvantages of the prior art, or which provides a useful alternative.

Throughout the specification where reference is made to a gas or fluid at atmospheric pressure it is to be understood that the atmospheric pressure is the expected normal atmospheric pressure at that particular location. While this is generally taken to be 101 kPa, atmospheric pressure will differ at different elevations.

Throughout the specification the term 'fluid' is used to describe a liquid or a gas.

The present invention provides a booster assembly comprising at least one turbine unit and at least one booster apparatus, the booster apparatus comprises a booster housing adapted to be connected to an outlet of a turbine unit whereby a second fluid passes along a fluid path extending through the turbine unit and passing into the booster housing, the booster apparatus having at least one inlet through which a first fluid passes to be entrained in the second fluid as the second fluid is flowing through the booster housing, the booster assembly further comprising a flow regulator for regulating the volume and velocity of the second fluid passing through the booster assembly, the flow regulator comprises a valve head adapted to be variably positioned along the fluid path, the valve head is supported on a shaft, the shaft is supported within the fluid path wherein the shaft is rotatable relative to the valve head.

The present invention further provides a booster apparatus for entraining a first fluid into a flowing second fluid, the first fluid being drawn from an atmosphere, the booster apparatus comprises a booster housing adapted to be connected to an outlet of a turbine unit whereupon being connected thereto the second fluid passes through the turbine unit before passing into the booster housing, the booster housing having at least one inlet through which the first fluid passes to be entrained in the second fluid when the second fluid is flowing through the booster housing.

Preferably the atmosphere is at atmospheric pressure.

Preferably the first fluid has a lower friction co-efficient than the second fluid.

In other arrangements the booster apparatus is adapted to be connected to a pump, compressor, engine or other fluid motive mechanism to cause the second fluid to accelerate therethrough. The fluid motive mechanism accelerates the second fluid such that the velocity of the second fluid passing through the booster apparatus is sufficient to form a low pressure region in the booster apparatus whereby the pressure of the lower pressure region is lower than the pressure of the first fluid before it enters the booster apparatus. Preferably the difference in pressure is up to 80 kPa between the atmosphere from which the first fluid is drawn and the low pressure region in the booster apparatus.

The present invention allows the first fluid to be drawn from the atmosphere, voiding the need for producing/compressing/pressurising the first fluid so that it can be entrained in the fluid.

The present invention provides a booster apparatus for entraining a first fluid in a flowing second fluid, the booster apparatus comprises a booster housing adapted to receive the second fluid from an outlet of a turbine unit, the booster housing having at least one inlet through which the first fluid passes to be entrained in the second fluid when the second fluid is flowing through the booster housing.

Preferably the booster apparatus is configured such that when the second fluid is passing therethrough a lower pressure region is formed therein, the lower pressure region being lower than the pressure of the first fluid before it enters the booster apparatus.

Preferably the first fluid is drawn from the atmosphere and is at atmospheric pressure prior to entering the booster apparatus.

The booster apparatus may be integrally formed with the turbine unit, may be adapted to be connected to the turbine unit, or may be adapted to be incorporated in a section of a pipeline downstream from the turbine unit.

The first fluid may be induced to flow through the at least one inlet into the booster housing to be entrained in the second fluid.

Preferably the at least one inlet comprises an inlet passage having a first end connected to the booster housing and a second end exposed to the atmosphere from which the first fluid may be drawn . . . . When the atmosphere is that surrounding the earth the second end directly draws air from the atmosphere to be entrained in the second fluid.

The inlet passage may be located at any angle relative to the booster housing. In one embodiment the inlet passage is orientated at an angle acute to the longitudinal axis of the booster housing.

In another embodiment the at least one inlet may be in the form of a plurality of openings arranged around the circumference of the booster housing and configured in a manifold arrangement.

The inlet passage may be provided by a cylindrical tube. The cross sectional profile of the inlet passage may take any form, but for ease of manufacture the cross section is preferably circular. The inlet passage may comprise a non-return valve such that the first fluid can only flow in one direction through the inlet passage into the booster housing. It also prevents the discharge of the second fluid therethrough should the pressure in the booster apparatus be greater than atmospheric pressure.

The inlet passage may have a regulation device, such as a gate valve, for regulating the amount of first fluid which may pass through the inlet passage. The regulation device may be located at or adjacent the second end of the inlet passage.

Preferably the booster apparatus incorporates a reducing nozzle. The reducing nozzle is configured such that when fluid flows therethrough a lower pressure region is created within the booster housing.

The reducing nozzle may be located adjacent a first end of the booster housing. The reducing nozzle may extend inwardly from the first end of the booster housing.

The booster apparatus may incorporate an annular space defined by an inner surface of a wall of the booster housing, and an outer surface of the reducing nozzle. At least a portion of the annular space overlaps with at least a portion of the lower pressure region when formed.

The reducing nozzle may be secured to the booster housing and extend inwardly from the first end of the booster housing.

The lower pressure region in the booster housing may be in fluid communication with the at least one inlet such that the first fluid is induced to flow through the at least one inlet into the booster housing, to be mixed with the second fluid flowing through the booster housing.

As the first fluid enters the booster housing the first fluid may mix with the second fluid. At least a portion of the first fluid may dissolve within the fluid.

The booster apparatus may further comprise a diffuser downstream from the reducing nozzle. The diffuser may be in the form of a venturi diffuser. The diffuser increases the velocity of the combined fluid (second fluid with first fluid entrained therein) and accelerates the combined fluid through the diffuser. This increases the suction capacity of the booster apparatus and facilitates mixing of the first fluid with the second fluid.

The combined fluid that leaves the booster housing contains more first fluid therein than the second fluid as it entered the booster apparatus.

When the first fluid is lighter than the second fluid, such as when the first fluid is a gas, the first fluid entrained within the second fluid naturally tends to rise to a higher elevation. This assists to overcome the pressure head in the case where the first fluid has a friction coefficient lower than the second fluid, lifting the combined fluid to an elevated position. As the first fluid entrained in the second fluid 'encourages' the combined fluid to move to an elevated position the power required to transport the combined fluid is reduced. This saves not only in power but also reduces the number and/or size of pumps required in the pipeline system to transport the second fluid through the pipeline.

Another advantage relates to the reduction of friction of the combined fluid on the pipeline as a result of the first fluid/gas being entrained therein. This reduction allows the pipeline system to be designed with smaller diameter pipe as well as pipes having a lower rating in terms of strength capabilities. This provides significant savings when installing a new pipeline.

The present invention provides a booster apparatus for entraining gas in a flowing fluid, the booster apparatus having a fluid inlet for receiving the flowing fluid, the booster housing having at least one inlet through which a gas passes to be entrained in the fluid when the fluid is flowing therethrough.

The booster apparatus may comprise a booster housing having a first end which provides the fluid inlet and a second end through which the fluid exits the booster housing, the booster housing may have a longitudinal extent.

The at least one inlet may be located between the first end and the second end of the booster housing. The at least one inlet may be provided by an inlet passage, which may be defined by a tube, located at an intermediate position located between the first end and second end of the booster housing.

In one aspect of the invention the longitudinal axis of the tube is at an acute angle to the longitudinal axis of the booster housing.

In another aspect of the invention the longitudinal axis of the tube is perpendicular to the longitudinal axis of the booster housing.

The intermediate position may be located along the booster housing such that the at least one inlet is in fluid communication with a region in the booster housing which has a lower pressure than a region upstream from the at least one inlet when the fluid is flowing through the booster apparatus. The pressure of the lower pressure region is preferably lower than the pressure of the gas before it enters the booster apparatus. Preferably the gas is at atmospheric pressure. Preferably the pressure difference between atmosphere and the lower pressure region is 80 kPa.

The intermediate position may be aligned with an annular space defined by an inner surface of a wall of the booster housing, and an outer surface of a nozzle of the booster apparatus such that the at least one inlet is located in the lower pressure region. The pressure difference between the pressure of the lower pressure region and the pressure of the gas before it enters the booster apparatus is such that gas is caused to enter the booster apparatus through the at least one inlet.

At least a portion of the annular space may overlap with at least a portion of the lower pressure region.

The booster apparatus may be coupled with a fluid motive mechanism to provide the fluid which passes through the booster apparatus with a motive force.

The present invention further provides a booster assembly comprising at least one fluid motive mechanism that supplies the motive fluid force (such as an external power source) and at least one booster apparatus, the at least one booster apparatus being as herein before described.

The fluid motive mechanism that supplies the motive fluid force may be in the form of a turbine, a pump, a compressor, an engine, or similar device. In these arrangements the energy of the fluid flowing from an elevated position relative to the booster apparatus may be utilised.

The present invention further provides a booster assembly comprising at least one turbine unit and at least one booster apparatus, the at least one booster apparatus being as herein before described.

The booster assembly does not require any additional fluid motive mechanism if the submergence factor is at least 30% of the elevation to be pumped. That is to say the power provided by the turbine unit must be sufficient to at least overcome 30% of the head between the booster apparatus and the elevated position to which the fluid is to be transported. The reduction in required power is a direct result of the decrease in friction between the fluid (with entrained gas), and the pipeline, as well as the influence the entrained gas has on the fluid to lift it to an elevation.

The present invention further provides a booster assembly comprising at least one turbine unit and at least one booster apparatus, the booster apparatus comprises a booster housing adapted to be connected to an outlet of a turbine unit whereby a second fluid passes along a fluid path extending through the turbine unit and passing into the booster housing, the booster apparatus having at least one inlet through which a first fluid passes to be entrained in the second fluid as the second fluid is flowing through the booster housing.

The at least one turbine unit and at least one booster apparatus may be integrally formed, may be securely attached to each other, such as with the use of fasteners, or may be adapted to be incorporated in a section of a pipeline wherein the booster apparatus is spaced from the turbine unit.

The booster assembly may further comprise a flow regulator for regulating the volume and velocity of the second fluid passing through the booster assembly. The flow regulator may be positioned adjacent the inlet of the at least one turbine unit. The flow regulator may be adjustable.

The flow regulator comprises a valve head adapted to be variably positioned along the fluid path.

The fluid path may incorporate a portion having a reduced diameter, such as may be provided by a converging section/nozzle incorporated in the booster assembly. The valve head may be variably positioned with respect to the reduced portion to regulate the flow of the second fluid along the fluid path. By positioning the valve head close to the reduced portion the flow of the second fluid is reduced as the cross sectional area of the fluid path is reduced. By moving the valve head away from the reduced portion the flow of the second fluid increases as the cross sectional area of the fluid path is increased.

In one aspect of the invention the flow regulator may be positioned upstream of the at least one turbine unit. The reduced portion may be in the form of a nozzle located between the flow regulator and the at least one turbine unit, or may be part of the turbine unit.

In another aspect of the invention the flow regulator may be positioned between the at least one turbine unit and the at least one booster apparatus.

The valve head may have a surface which complements the shape of the portion having a reduced diameter, for example the surface of the valve head complements the shape of the nozzle.

In one aspect of the invention the valve head may be manually positioned. The valve head may be manually positioned by an adjustment device, such as a wheel, located external of the fluid path. The adjustment device may operatively engage the valve head, such engagement may be through a rack and pinion arrangement.

In another aspect of the invention the valve head may be positioned remotely by a control centre.

In another aspect of the invention the valve head may be positioned automatically based on the flow requirements of the fluid passing therethrough. Such a system may incorporate one or more sensors to measure characteristics of the fluid flow. These measurements are used to cause movement of the valve head as may be required to achieve the required flow output.

The valve head may comprise an enlarged portion located at an end of a sleeve. The valve head may be rotatably positioned on a shaft, the shaft may be supported within the fluid path.

The booster assembly may have a nozzle incorporated in an outlet thereof such that the velocity of the fluid leaving the booster housing is increased.

In use the booster assembly may be located downstream from a pump. In alternative embodiments the booster assembly is located in a pipeline whereby fluid from an elevated position is delivered thereto, negating the need for a pump.

Preferably the at least one turbine unit comprises one or more drive turbine blade sets located upstream from one or more pump turbine blade sets mounted within a turbine passage of a turbine housing. The blades of each turbine blade set may be configured to create maximum fluid velocity to induce the greatest possible pressure differential between the inlet of the turbine and the region formed between the one or more drive turbine blade sets and the one or more pump turbine blade sets.

Preferably the drive turbine blade set and pump turbine blade set are mounted on a common shaft such that they are confined to rotate in the same direction and same speed. The shaft may also rotatably support the valve head of the flow regulator. In an alternative embodiment the drive turbine blade set and pump turbine blade set may be rotatably fixed and the turbine housing rotates therearound.

The drive turbine blade set and pump turbine blade set may be mounted in opposed relation whereby the pump turbine blade set is in reverse relation to the drive turbine blade set such that in operation the drive turbine blade set pushes the fluid towards the pump turbine blade set, and the pump turbine blade set draws the fluid away from the drive turbine blade set. The simultaneous operation of the turbine blade sets may create a low pressure region between the drive and pump turbine blade set, this pressure may be lower than the pressure of the fluid supplied to the turbine unit. The simultaneous operation of the turbine blade sets may create a low pressure region in front of the drive turbine blade set, this pressure may be lower than the pressure of the fluid supplied to the turbine unit.

With this configuration a low pressure region is created between the two turbine blade sets when compared with the fluid pressure at an opening of the turbine passage. Furthermore, as the pump turbine blade set draws the fluid through the turbine unit a region of lower pressure is also formed upstream from the drive turbine blade set. As a result there is minimal impediment to flow at the front of the turbine unit, which is typically experienced by prior art devices. Due to the pump turbine blade set and its reversed orientation with respect to the drive turbine blade set, the mass flow through the turbine unit is significantly increased. Furthermore, the velocity of the fluid striking the drive turbine blade set is increased.

The larger pressure differential induces a larger mass flow rate as fluid travels from a high pressure region (front of the turbine unit) to a relatively lower pressure region. The higher pressure region could be caused by either natural, i.e. atmospheric pressure, or forced, i.e. pumped or pressure head. Furthermore the pumping turbine blade set evacuates the fluid and at the same time, lowers the potential of back pressure.

Preferably, where there is only a single turbine unit the velocity of the fluid striking the driver turbine blade set is greater than the terminal velocity of the fluid. This may be influenced by the size of the pump turbine blade set.

Each turbine blade set may be in the form of a set of blades which is rotated by the force of the fluid striking the blades.

In one aspect of the invention the drive turbine blade set and pump blade set are in spaced apart relation.

In another aspect of the invention the drive turbine blade set and pump blade set overlap each other.

The at least one turbine unit may be coupled to at least one generator. The coupling may be via a chain drive, belt drive, direct coupling shaft to shaft, via a gear box, or other known means. The at least one turbine unit may be coupled to a motor.

As the fluid flows through the turbine passage, the flow drives the drive turbine blade set and simultaneously rotates the pump turbine blade set. As the pump turbine blade set rotates, it effectively pulls the fluid toward it, creating a lower pressure region between at least the two turbine blade sets.

As the pump blade set rotates, the fluid is pulled through the system and pushed out of the turbine unit, minimizing the back flow pressure and energy losses associated with pressure accumulation behind and in front of the drive blade set. The act of pushing the fluid out of the turbine passage also overcomes the pressure head which may exist at the exit of the turbine passage. As the pump blade set rotates a low pressure zone is formed between the pump blade set and upstream of the drive turbine blade set, creating a pressure gradient differential. This causes the fluid to accelerate from the higher upstream pressure to the low pressure zone, increasing the velocity of the fluid. The doubling of the increase in velocity represents an increase of squaring in the available energy. Through rotation of the drive turbine set, energy is transferred to the shaft as mechanical energy. This is available for use by the pump blade set to pump the fluid to a head which is equivalent to the mechanical energy transferred onto the shaft from the drive turbine blade set.

Owing to the orientation of each turbine blade set with respect to each other, the effect of the pump turbine blade set also minimises turbulence within the system, having the effect of straightening the fluid flow as it passes from the drive turbine blade set.

The turbine unit may further comprise screens at the drive end and pump end of the turbine passage to prevent debris and animals entering the turbine passage.

In one aspect of the invention, the pump turbine blade set is the same size as the drive turbine blades.

In another aspect of the invention the pump turbine blade set is larger in diameter than that of the drive turbine blade set. Preferably the optimum ratio for the diameter of the drive turbine blade set to the pump turbine blade set is 1:1.617.

In one aspect of the invention the drive turbine blade set and pump turbine blade set can be interlocked so as to overlap each other.

In another aspect of the invention the drive turbine blade set and pump turbine blade set are in a spaced apart relation. The drive turbine blade set and pump turbine blade may be spaced at a ratio of 3.2 times the diameter of the drive turbine blade set. The spacing to the drive turbine blade set and pump turbine blade set can be varied from this ratio.

The drive turbine blade set and pump blade can be in a spaced apart relation which allows the pump turbine blade set to be smaller, the same size or larger in diameter to the diameter of the drive turbine blade set.

The turbine passage may comprise a chamber located between the drive turbine blade set and pump turbine blade set. The chamber may extend outwardly from the drive turbine blade set before converging as it approaches the pump turbine blade set.

The turbine passage may comprise a converging portion located upstream from the drive turbine blade set. The turbine passage may also comprise a diverging portion located downstream from the pump turbine blade set.

The converging portion reduces the cross sectional area through which the fluid flows, increasing the velocity and pressure of fluid passing therethrough and increasing the force at which the mass of the fluid is striking the drive blade set. Whilst the diverging portion decreases the fluid velocity and pressure of fluid passing therethrough. Each portion is configured to converge in a direction towards the chamber of the turbine unit.

The converging portion assists in increasing the fluid velocity as it moves towards the drive turbine blade set. This, combined with the action of the pump turbine blade set allows the fluid velocity to exceed the terminal velocity of the fluid due to gravity (which for water is 7 metres per second). It also induces fluid velocities up to, and in excess of 35 metres per second, allowing and ensuring maximum kinetic energy may be extracted from the fluid flow.

Preferably the diverging portion contributes to reducing the back pressure created by the fluid flow energy losses of the turbine blade set as the fluid moves away from the turbine blade set.

The drive turbine blade set may have a stator located upstream thereof for directing fluid onto the blades of the drive turbine blade set. Preferably the stator is coaxially mounted on the shaft. Additional stators may also be associated with other parts of the turbine unit. A stator is a set of blades which is stationary, whose main role is to deflect fluid.

In this instance, as a result of the impact of the pump turbine blade set on pressures within the turbine unit, the mass flow of the fluid and the associated pressure is not impeded by the stator, unlike prior art devices. Therefore the unimpeded mass flow at the higher velocity increases the force of the fluid striking the drive turbine blade set, which in turn increases the available energy that can be converted to electrical energy.

Multiple turbine units may be positioned in series. The units may be placed in an adjacent arrangement such that fluid exiting a turbine unit passes immediately into another adjacent turbine unit.

The use of multiple turbine units in series is only possible as a result of the pump turbine blade set which minimises the impediment of fluid flow and pressure, which would otherwise exist with at the drive turbine blade set.

There may be multiple turbine units arranged substantially in series with varying orientations and configurations with respect to each other. It is to be understood that these configurations are included in the scope of this invention.

Each turbine unit may be mounted on an independent shaft.

It is to be understood that fluid flow into and/or out of the turbine assembly may be through multiple paths and that this variation is covered by the current invention.

As the drive turbine blade set and pump blade set are positioned in reversed relation to each other, in one aspect of the invention the turbine blades of one turbine blade set are a mirror image of the turbine blades of the other turbine blade set when considered from a point between the two turbine blade sets. In another aspect the turbine blades of one turbine blade set are offset at an angle of 180° from the turbine blades of the other turbine blade set.

The drive turbine blade set and pump blade can be in a spaced apart relation which allows the pump turbine blade set to be smaller, the same size or larger in diameter to the diameter of the drive turbine blade set. In the alternative, the drive turbine blade set and pump turbine blade set may be interlocked or overlapped whereby the two blade set slightly overlap each other.

The drive turbine blade set and pump turbine blade set are positioned in opposed relation to each other, that is to say the blades are reversed relative to each other so that as the fluid strikes the drive turbine blade set, the blades commence rotation of the shaft. As the pump turbine blade set and the drive turbine blade set are connected to a common shaft, the pump turbine blade set will rotate simultaneously and at the same speed as the drive turbine blade set. As the pump turbine blade set rotates it creates a low pressure region behind the pump turbine blades, inducing a lower pressure region in front of the drive turbine blade set, as well as between the drive turbine blade set and pump turbine blade set. This results in increase mass flow of the fluid across the drive turbine blade set at a substantially higher pressure, resulting in the fluid striking the drive turbine blade set with more force.

The present invention further provides a pipeline comprising at least one booster assembly as herein before described.

The present invention further provides a pipeline comprising at least one booster apparatus as herein before described.

The present invention further provides a booster assembly comprising at least one turbine unit and at least one booster apparatus, the booster apparatus comprises a booster housing adapted to be connected to an outlet of a turbine unit whereby a second fluid passes along a fluid path extending through the turbine unit and passing into the booster housing, the at least one turbine unit comprising one or more drive turbine blade sets located upstream from one or more pump turbine blade sets mounted within a passage of a turbine housing, the one or more drive turbine blade sets and the one or more pump turbine blade sets are mounted on a common shaft such that they are confined to rotate in the same direction and same speed, the booster apparatus having at least one inlet through which a first fluid passes to be entrained in the second fluid as the second fluid is flowing through the booster housing, the booster assembly further comprising a flow regulator for regulating the volume and velocity of the second fluid passing through the booster assembly, the flow regulator comprises a valve head adapted to be variably positioned along the fluid path, the valve head is supported on the shaft, wherein the shaft is rotatable relative to the valve head The present invention further provides a booster assembly comprising at least one turbine unit and at least one booster apparatus,
 the booster apparatus comprises a booster housing adapted to be connected to an outlet of a turbine unit whereby a second fluid passes along a fluid path extending through the turbine unit and passing into the booster housing,
 the booster apparatus providing a nozzle extending inwardly from a first end of the booster housing;
 the booster apparatus having at least one inlet through which a first fluid passes to be entrained in the second fluid as the second fluid is flowing through the booster housing, the at least one inlet incorporates a regulating device to regulate the first fluid entering therethrough;
 the booster housing further comprises a diffuser located upstream from the nozzle;
 the booster assembly further comprising a flow regulator for regulating the volume and velocity of the second fluid passing through the booster assembly, the flow regulator comprises a valve head adapted to be variably positioned along the fluid path.

Preferably the valve head is supported on a shaft, the shaft is supported within the fluid path wherein the shaft is rotatable relative to the valve head.

The present invention further provides a booster assembly comprising a booster apparatus and a flow regulator at a first end of the booster apparatus, the booster apparatus comprising
 a booster housing adapted to be mounted in or to a pipeline, where through a second fluid passes along a fluid path extending through the booster housing,
 the booster apparatus providing a nozzle extending inwardly from a first end of the booster housing;
 the booster apparatus having at least one inlet through which a first fluid passes to be entrained in the second fluid as the second fluid is flowing through the booster housing, the at least one inlet incorporates a regulating device to regulate the first fluid entering therethrough;
 wherein the flow regulator comprises a valve head adapted to be variably positioned along the fluid path with respect to the nozzle such that the nozzle and valve head co-operate to regulate the second fluid passing into the booster housing.

Preferably the valve head is shaped to complement the shape of the nozzle.

Preferably the booster housing further comprises a diffuser located upstream from the nozzle.

Preferably the booster assembly further comprises a turbine unit located downstream from the flow regulator.

In alternative embodiments the booster apparatus is coupled with a fluid motive mechanism to induce the motive fluid force to cause an increase in the velocity of the fluid before it passes into the booster apparatus. The fluid motive mechanism that induces the motive fluid force may be in the form of an impeller pump, an air pump; a combustion engine, or a compressor arrangement. In yet another alternative, the fluid motive mechanism that induces the motive fluid force is in the form of a vacuum located downstream from the booster assembly.

BRIEF DESCRIPTION OF THE DRAWINGS

The invention will be better understood by reference to the following description of several embodiments thereof as shown in the accompanying drawings in which:

FIG. 6 is a perspective, modelled view of a booster assembly according to a third embodiment of the invention;

FIG. 7 is a cross sectional side view of the booster assembly of FIG. 6;

FIG. 16 is a cross sectional side view of FIG. 15 taken through section cc;

FIG. 17 is a perspective view of a valve head of a flow regulator;

FIG. 18 is a perspective view of a nozzle;

FIG. 20 is a cross sectional side view of FIG. 19.

In the drawings like structures are referred to by like numerals throughout the several views. The drawings shown are not necessarily to scale, with emphasis instead generally being placed upon illustrating the principles of the present invention.

BEST MODE(S) FOR CARRYING OUT THE INVENTION

The present invention has been designed to boost the flow of fluid to an elevated position. In so doing the cost to transport fluid is reduced as the capacity of the pump required to transport the fluid, and therefore the power required by the pump, is decreased. Furthermore, friction between the flowing fluid and the pipeline is reduced. This permits the use of smaller diameter pipes.

According to an aspect, the present invention is in the form of a booster assembly comprising a booster apparatus upstream of a turbine unit wherein the booster apparatus is designed to introduce a first fluid, such as a gas into a pipeline. For the purposes of the below embodiments, reference will be made to the introduction of air into the pipeline.

The below embodiments can also be used to cause a fluid to be entrained within the flowing fluid, entering the flowing fluid in the same manner as the gas would become entrained therewith. This variation is considered to be within the scope of this invention.

The intent of the booster apparatus is to create a low pressure region therein, whereby the low pressure region is in fluid communication with an inlet. When the low pressure region is formed, the first fluid, which is drawn from the atmosphere and is at atmospheric pressure is caused to enter the booster apparatus through the inlet and entrained with the fluid passing therethrough. In order to create a lower pressure region within the booster apparatus sufficient to induce sufficient flow through the inlet, a fluid motive mechanism is required. This fluid motive mechanism ensures the fluid passing into the booster apparatus has been accelerated to a velocity which will allow the formation of the lower pressure region. The fluid motive mechanism may be a pump, a turbine unit or similar. Where the fluid motive mechanism is provided by a turbine unit, as described herein, the energy provided in the fluid as it flows from an elevated position to the booster apparatus may be sufficient. Such is the case where the submergence factor of the turbine unit is 30%.

Where applicable, each of the figures show arrow A as being indicative of the direction of fluid flow.

Figure 1:
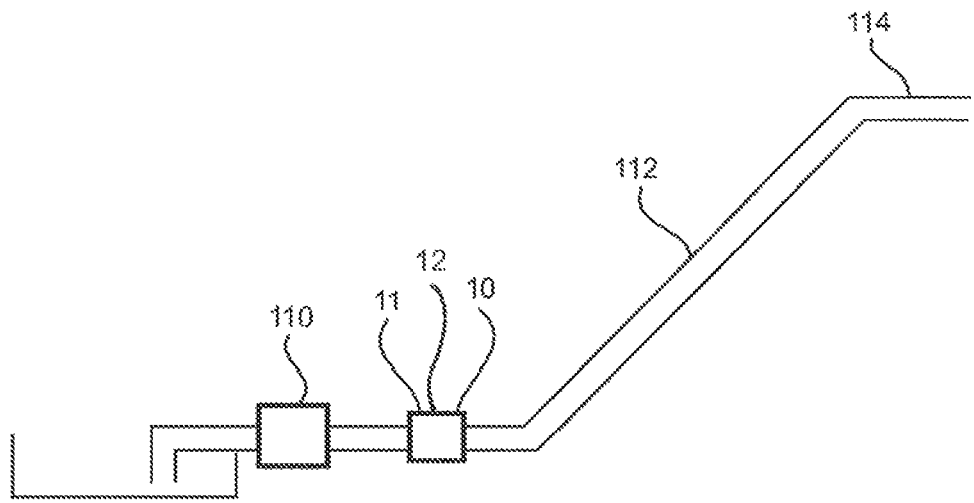
FIG. 1 is a schematic view of a booster assembly according to a first embodiment of the invention shown in a preferred application.
Figure 2:
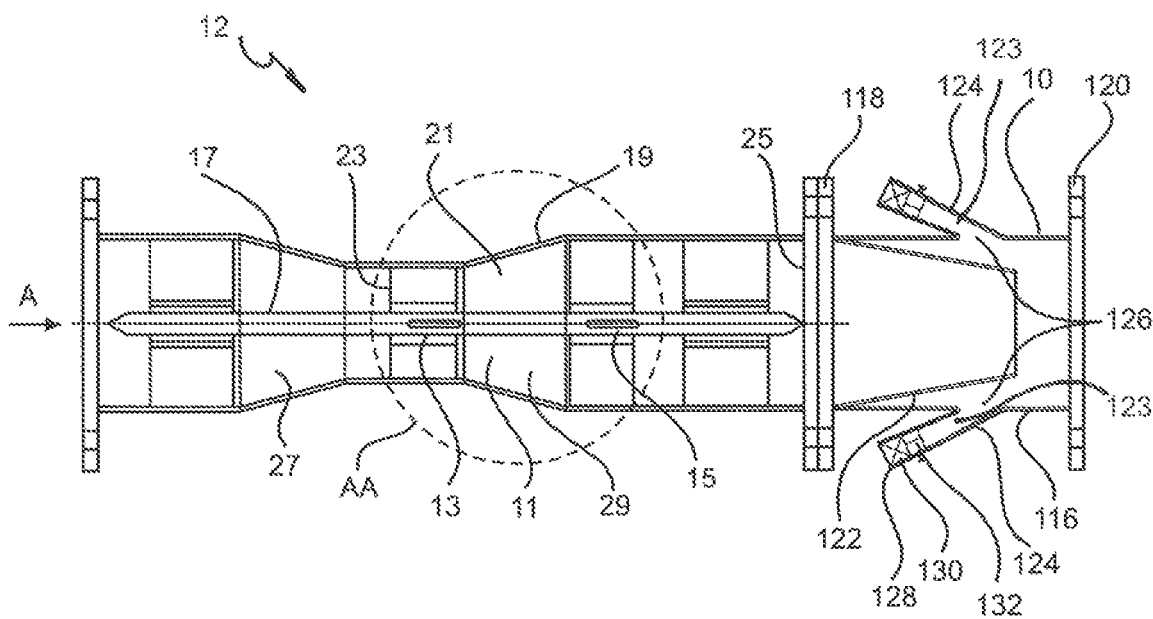
FIG. 2 is a cross sectional side view of the booster assembly of the first embodiment.
Figure 3:
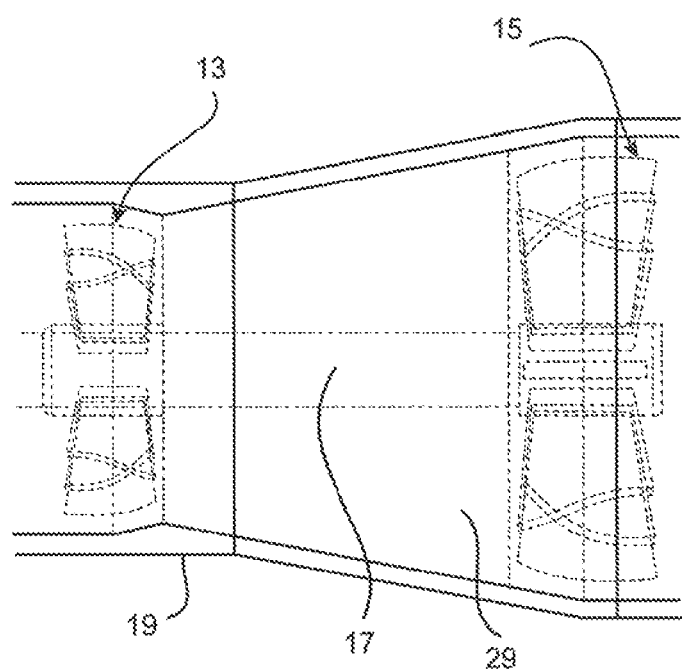
FIG. 3 is a close up view of a turbine unit in FIG. 2 denoted by section AA.

According to a first embodiment of the present invention as shown in FIGS. 1 to 3, a booster assembly 12 is incorporated in a pipeline 112 for transporting water. The booster assembly 12 is located at the bottom of an elevated position 114. However, it is to be understood that the booster assembly 12 may also be located anywhere along the pipeline 112, although it is preferable for it to be at the bottom relative to the elevated position, or at an interim position.

In the application shown a pump 110 is positioned upstream from the booster assembly 12 for feeding water thereto.

In alternative embodiments the pump 110 is replaced by a reservoir at a suitable head relative to the booster assembly 12 (typically a head greater than 3 m).

In yet further embodiments the booster assembly 12 is gravity feed water, such as would occur when the pipeline delivers water to the booster assembly 12 from an elevated position.

In this embodiment the booster assembly 12 comprises a turbine unit 11 and a booster apparatus 10 which is bolted to the turbine unit 11, however, it is to be understood that the booster apparatus 10 may be formed as an integral part of the turbine unit 11.

The booster assembly 12 provides a fluid path extending through the turbine unit 11 and the booster apparatus 10.

The booster apparatus 10 comprises a booster housing 116, a first flange 118, for connecting the booster apparatus 10 to an outlet 14 of the turbine unit 11, and a second flange 120 for connecting to the pipeline 112. The booster apparatus 10 incorporates a converging nozzle 122 for reasons which will be described below.

The booster apparatus 10 also comprises two inlets 123, each in the form of a tube 124. Each inlet allows gas to pass into the booster housing 116.

Each tube 124 has a first end 126 connected to the booster housing 116 so as to be in fluid communication therewith. Each tube 124 has a second end 128 which is open to the atmosphere.

Adjacent the second end 128 the tube incorporates a non-return valve 130. The non-return valve 130 allows air to enter the tube 124, while preventing liquid from exiting the booster apparatus 10 through the tubes 124.

Each tube 124 also incorporates a regulating device in the form of a gate valve 132. The gate valve 132 is adjustable to control the size of the inlet of the tube 124 so as to regulate the amount of air which may pass through the tube 124 and into the booster housing 116.

Each turbine unit 11 comprises a drive turbine blade set 13 and a pump turbine blade set 15 coaxially mounted on a common shaft 17.

The drive turbine blade set 13 and pump turbine blade set 15 are positioned in a turbine passage 21 formed in a turbine housing 19. The turbine passage 21 forms part of the fluid path of the booster assembly 12 and channels fluid to the drive turbine blade set 13 and pump turbine blade set 15.

The turbine passage 21 has a first end 23 and a second end 25. The turbine passage 21 also incorporates a converging portion 27 located between the first end 23 and the drive turbine blade set 13, and a diverging portion 29 located between the drive turbine blade set 13 and the pump turbine blade set 15.

In initial operation, the pump 110 supplies fluid to the booster assembly. The fluid enters the turbine unit 11, increasing in velocity as it passes through the converging portion 27 of the turbine passage 21. The fluid strikes the drive turbine blade set 13 leading to the simultaneous rotation of the shaft 17 and the pump turbine blade set 15.

Once the pumping turbine blade set 15 is rotating a region of low pressure is created in the portion of the turbine passage 21 between the two turbine blade sets 13, 15. This pressure difference is dependent on the configuration of the turbine unit but would typically be in the range of 10-90 kPa below atmospheric pressure. The pump turbine blade set 15 effectively pulls the fluid away from the drive turbine blade set 13 until it passes through the pump turbine blade set 15. It then pushes the fluid out from the first turbine unit 11. The reduction in pressure accelerates the velocity of the fluid impacting the drive turbine blade set to between 3 to 35 m/sec and higher. At full mass flow (or greater) the substantial increase in velocity caused by the lower pressure region increases the force striking the driving turbine blade set which is converted to mechanical energy through the shaft 17. This assists in continued operation of the turbine unit.

Furthermore, the pulling action of the pump turbine blade set 15 on the fluid mitigates the effect of backflow pressure losses created by the drive turbine blade set 13 as well as the build-up of pressure which may be caused at the front of the drive turbine blade set 13, and creates a further low pressure region upstream from the drive turbine blade set 13. The pulling effect also assists in reducing turbulence and increasing fluid velocity.

As fluid enters the turbine passage 21 of the turbine unit 11 it is accelerated through the converging portion 27 towards the drive turbine blade set 13. As the drive turbine blade set 13 rotates the pump turbine blade set 15 also rotates to draw more fluid through the turbine passage 21. The rotation of the pump blade set 15 is induced by the rotation of the drive blade set 13 since they are mounted on the same shaft.

As the blades of the pump turbine blade set 15 are reversed to those of the drive blade set 13 the pump turbine blade set 15 pulls the fluid from the drive blade set 13 and propels it into the pipeline section 116 of the booster apparatus 10 at high velocity (typically >12 m/sec).

As the water enters the booster apparatus 10 it passes through the converging nozzle 122 to be accelerated. As the water accelerates it creates a low pressure region 134. Owing to the configuration of the booster apparatus 10 the low pressure region 134 is formed around or within close proximity of the second end 128 of each tube 124. As the pressure at the second end 128 of each tube 124 is lower than the pressure at the first end 126 of each tube 124, air is drawn into the booster housing 116 through each tube 124.

The air that is drawn from the atmosphere into the booster apparatus 10 mixes with the water so as to be entrained with the water, wherein a portion of the air may dissolve within the water. The air within the water naturally tends to rise, lifting the water with it. This significantly reduces the amount of energy required to pump the water through the pipeline 112 to the elevated position 114. Furthermore, as the water rises, the air entrained therewith expands to further enhance the transportation of the water to the elevated position.

Figure 4:
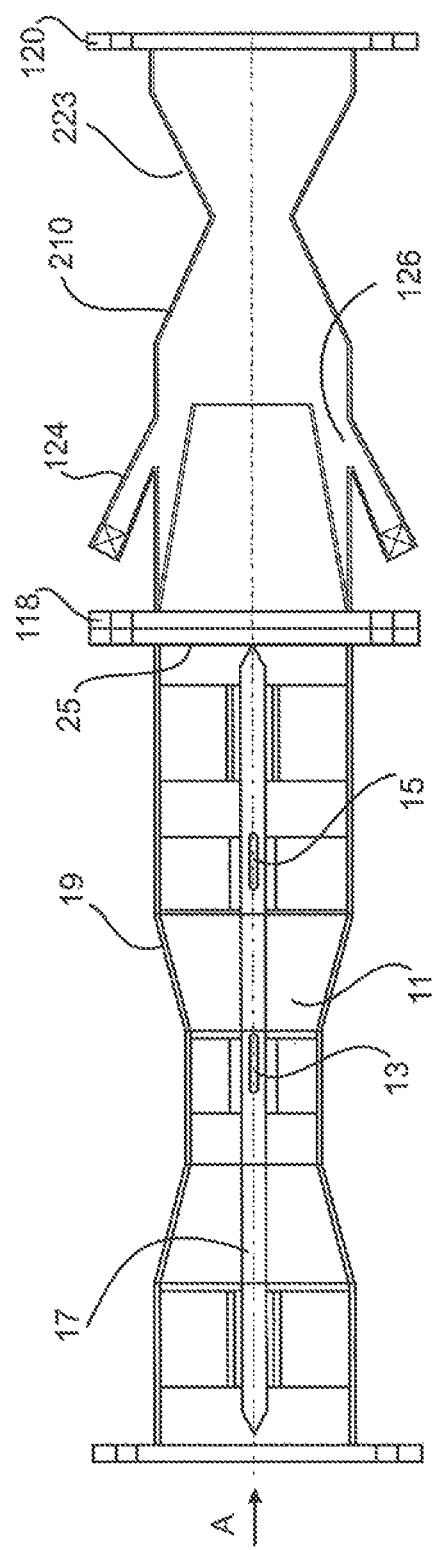
FIG. 4 is a cross sectional side view of a booster assembly according to a second embodiment of the invention.
Figure 5:
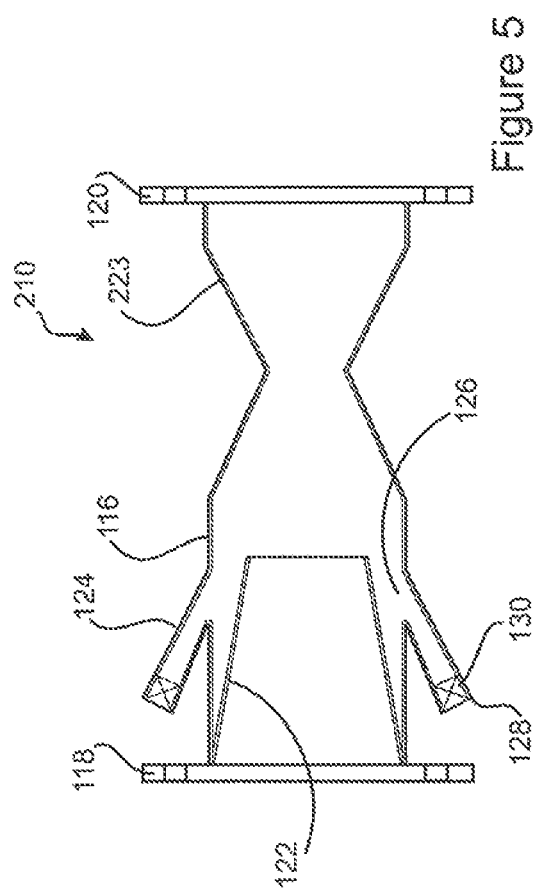
FIG. 5 is a cross sectional side view of a booster apparatus as shown in FIG. 4.
Figure 8:
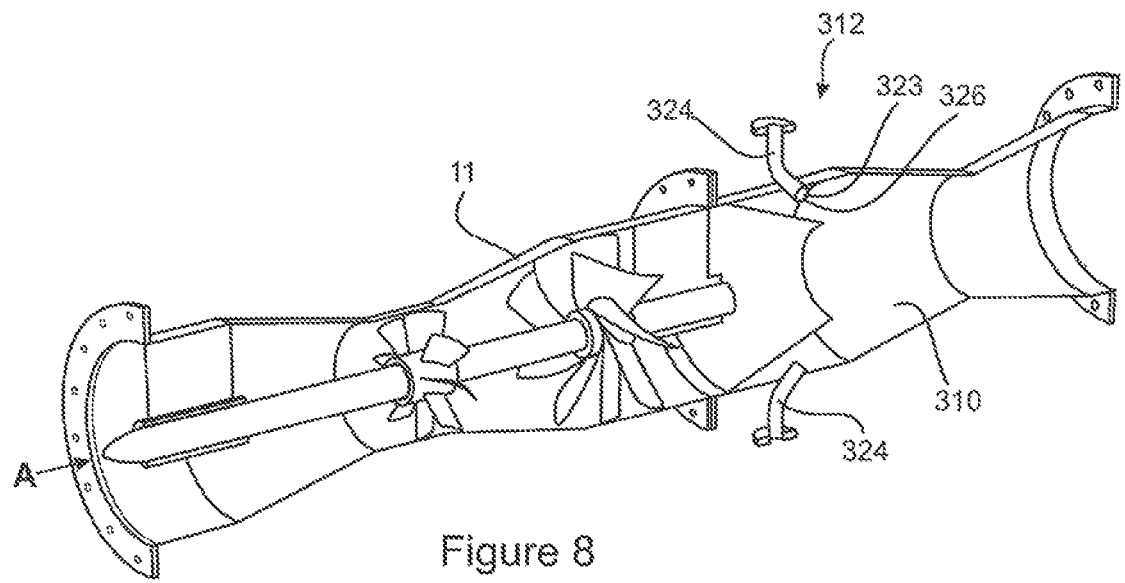
FIG. 8 is a cross sectional front perspective view of the booster assembly of FIG. 6.
Figure 9:
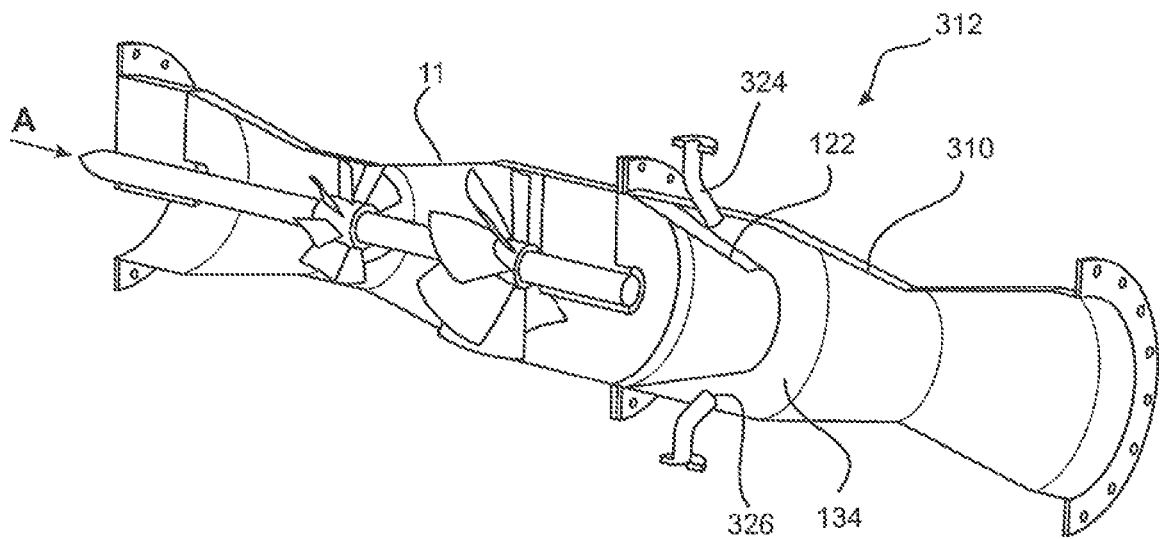
FIG. 9 is a cross sectional rear perspective view of the booster assembly of FIG. 6.

A booster assembly 212, according to a second embodiment of the present invention is shown in FIGS. 4 and 5. For convenience, features of the booster assembly 212 that are similar or correspond to features of the booster assembly 12 of the first embodiment have been referenced with the same reference numerals.

As with the first embodiment the booster assembly 212 comprises a turbine unit 11 and a booster apparatus 210. The turbine unit is as described in the first embodiment.

The booster apparatus 210 has a similar construction to the booster apparatus 10 of the first embodiment. As shown in FIG. 5, the booster apparatus 210 further comprises a diffuser in the form of a venturi diffuser 223 located upstream from the converging nozzle 122. The venturi diffuser 223 accelerates the fluid passing therethrough to further assist in lifting the fluid to the elevated position. Furthermore, the venturi diffuser 223 causes further mixing of the gas with the fluid, resulting in greater absorption of the gas in the fluid. This further assists in lifting the fluid to the elevated position.

A booster assembly 312, according to a third embodiment of the present invention is shown in FIGS. 6 to 9. For convenience, features of the booster assembly 312 that are similar or correspond to features of the booster assembly of the first and second embodiments have been referenced with the same reference numerals. The booster assembly comprises a booster apparatus 310 connected to a turbine unit 11.

The booster assembly 312 of the third embodiment is very similar to that of the second embodiment. A difference is in relation to the orientation of two inlets 323. As with previous embodiments, each inlet 323 is provided by a tube 324, wherein a first end 326 of each tube 324 terminates in a low pressure region 134 created in the booster apparatus 310.

Figure 10:
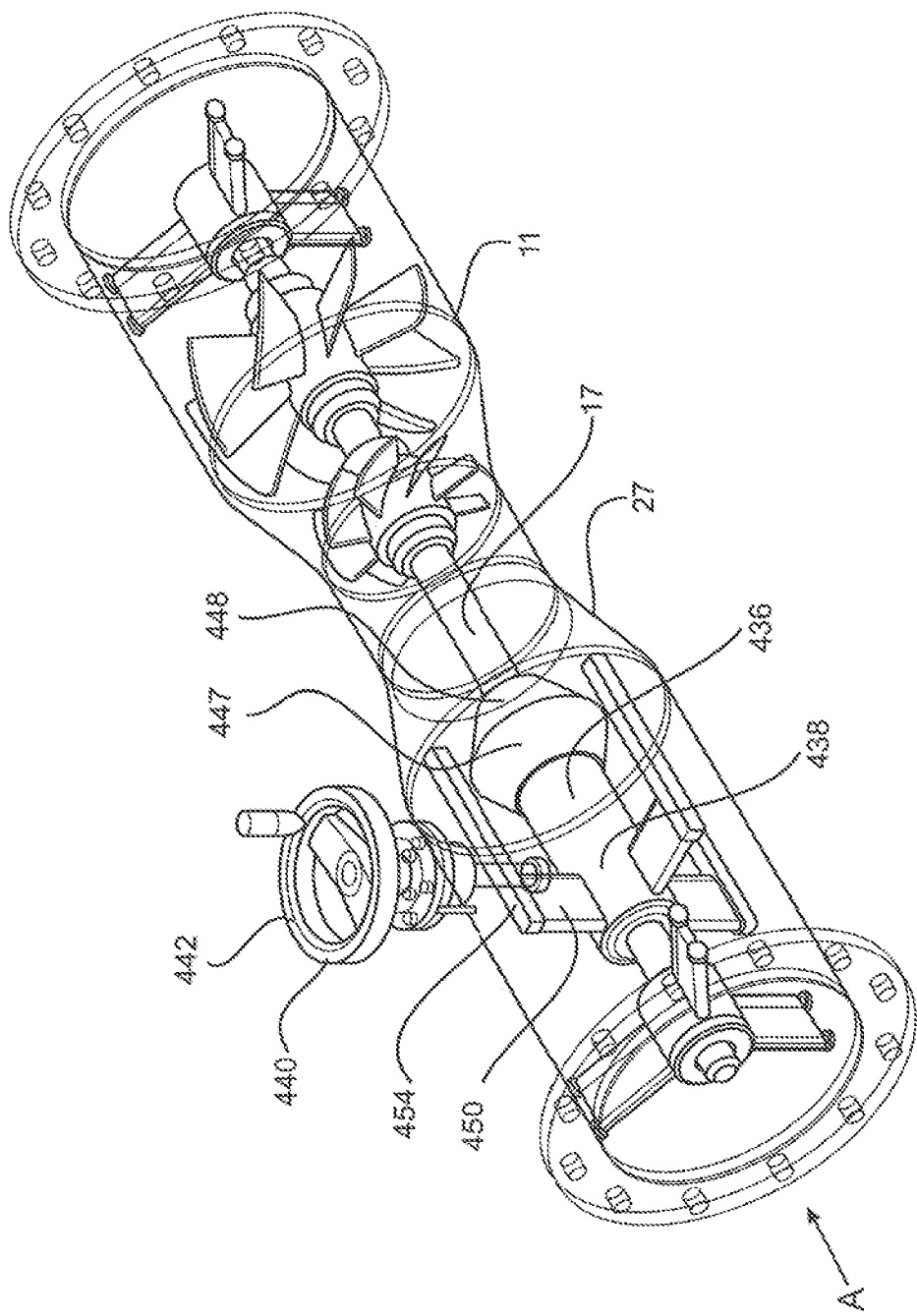
FIG. 10 is a perspective view of a flow regulator and a turbine unit of a booster assembly according to a fourth embodiment of the invention.
Figure 11:
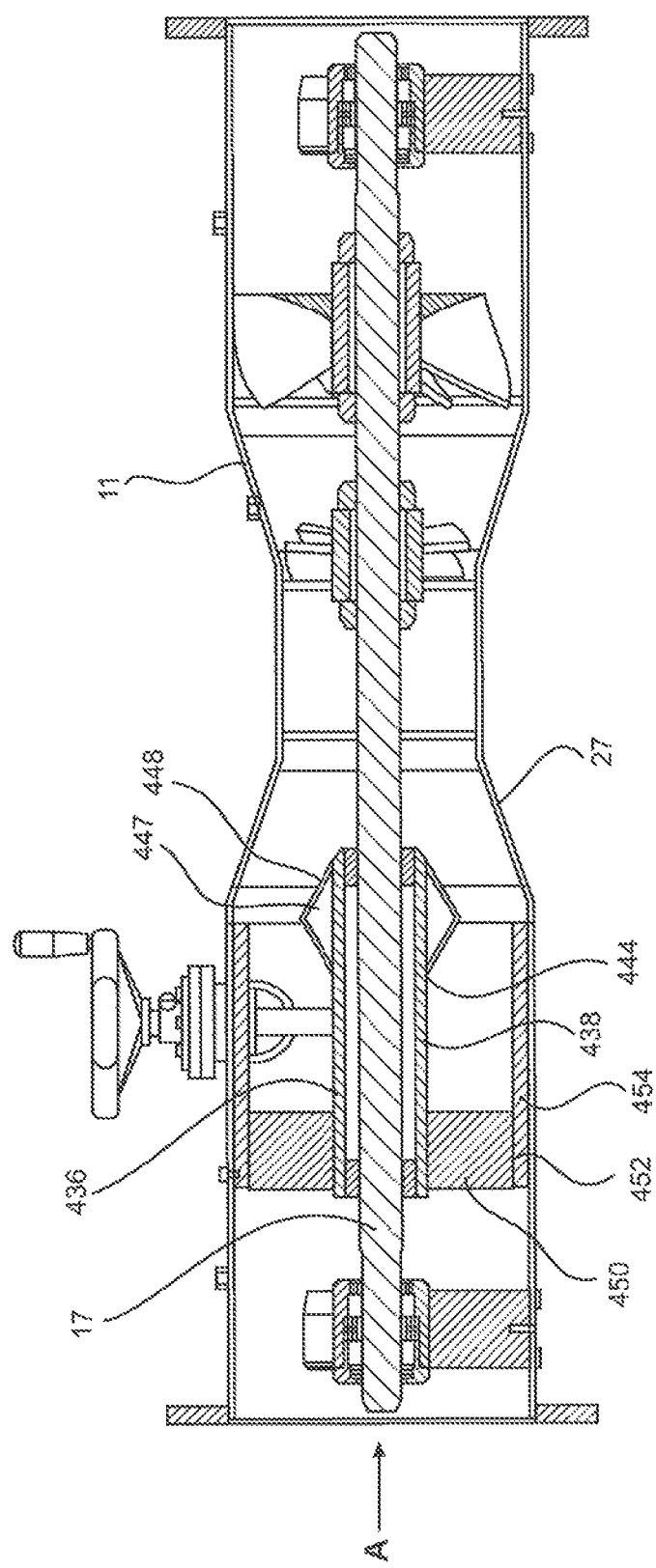
FIG. 11 is a cross sectional side view of FIG. 10.
Figure 12:
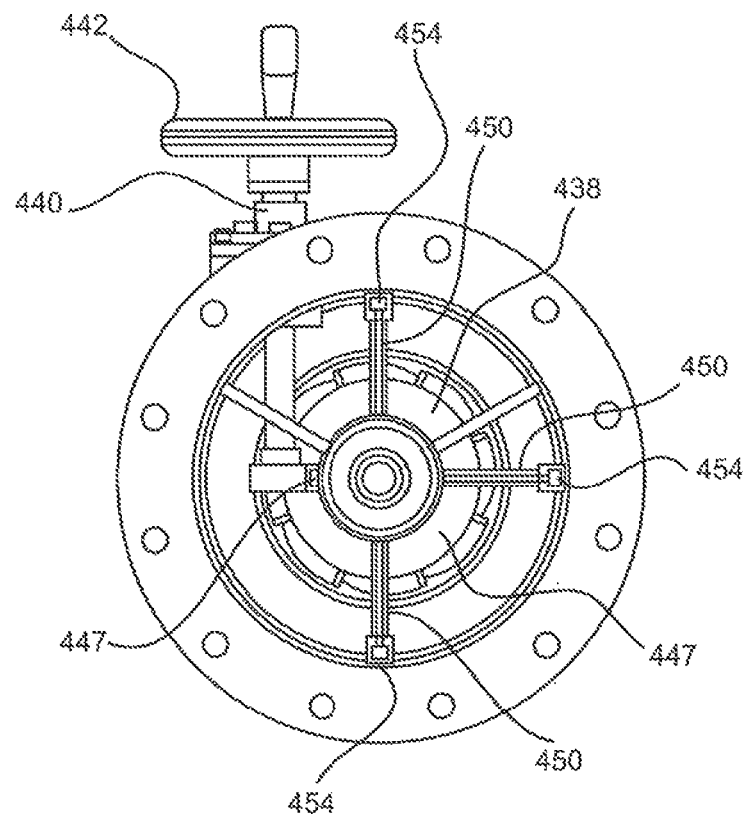
FIG. 12 is an end view of FIG. 10.
Figure 13:
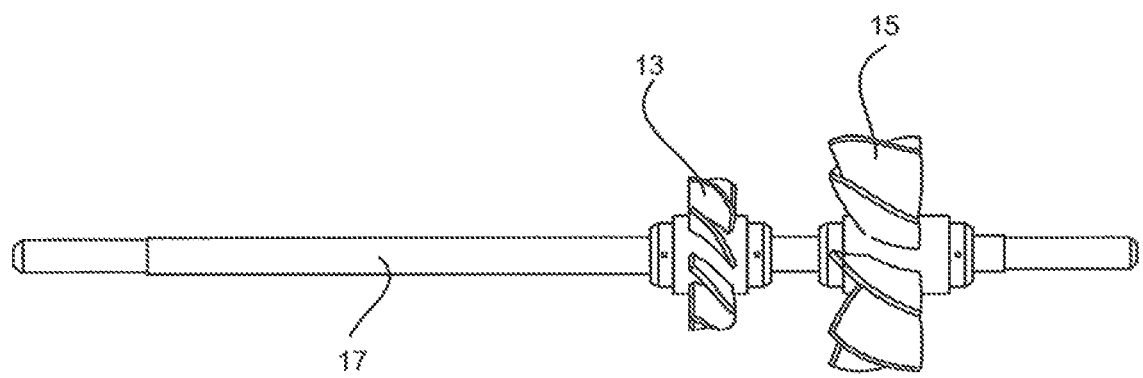
FIG. 13 is a side view of a pumping turbine blade set and driving turbine blade set mounted on a shaft.

A booster assembly 412, according to a fourth embodiment of the present invention is shown in FIGS. 10 to 12. For convenience, features of the booster assembly 412 that are similar or correspond to features of the booster assembly of the first embodiment have been referenced with the same reference numerals.

The booster assembly 412 comprises a booster apparatus (not shown) connected to a turbine unit 11. While the booster apparatus is not shown in FIGS. 10 to 12, the booster apparatus may, for example, take the form of any of the booster apparatus shown in the previous embodiments, or as otherwise described above.

The booster assembly 412 also comprises a flow regulator 436 for regulating the flow characteristics of the fluid passing through the booster assembly 412. The flow regulator 436 comprises a valve head 438 which is rotatably supported on a shaft 17 such that the valve head 438 is mounted in the fluid path. As best shown in FIG. 11 a drive turbine blade set 13 and pumping turbine blade set 15 of the turbine unit 11 are also mounted on the shaft 17.

An adjustment mechanism 440 operatively engages the valve head 438 such that the valve head is variably positioned along the shaft 17. In this embodiment the adjustment mechanism 440 is manually operable and comprises a wheel 442 external the booster assembly 410. The wheel 442 engages a sleeve 444 of the valve head 438 through a rack and pinion arrangement 446 whereby rotation of the wheel 442 translates to longitudinal movement of the valve head 438 along the shaft 17.

An enlarged end 447 of the valve head 438 has a profile which is complementary to a nozzle 27 of the turbine unit 11. A surface 448 of the enlarged end 447 of the valve head 438 co-operates with an inner surface of the nozzle 27 to regulate the flow of fluid through the booster assembly 410. Movement of the valve head 438 towards the nozzle 27 reduces the cross sectional area of the fluid path to slow the volume and velocity of the fluid passing through the booster assembly 412. Movement of the valve head 438 away from the nozzle 27 increases the cross sectional area of the fluid path, allowing a greater volume of fluid to pass through the booster assembly 412.

The valve head 438 is angularly supported within the booster assembly 412 to prevent rotation of the valve head 438, while still permitting rotation of the shaft 17. As best shown in FIGS. 12 and 17 the valve head 438 is supported by three fins 450 which extend radially outward from the sleeve 444. An end 452 of each fin 450 is received in guide tracks 454. The guide tracks 454 permit travel of the fin 450 along the longitudinal extent of the guide track 454.

Figure 14:
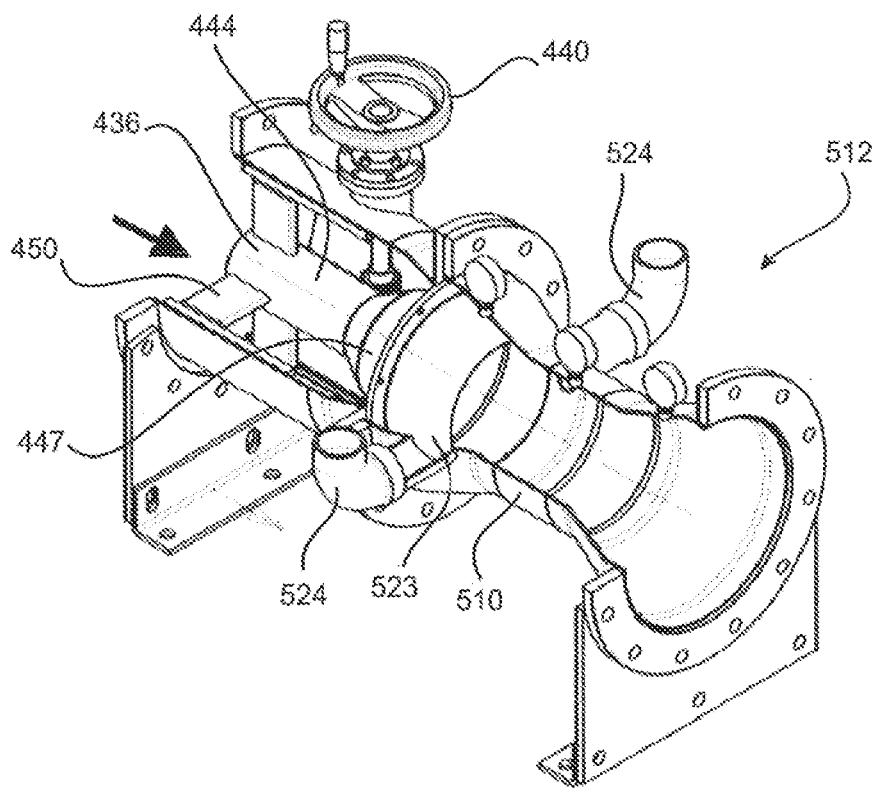
FIG. 14 is a perspective view of a flow regulator and a booster apparatus of a booster assembly according to a fifth embodiment of the invention.
Figure 15:
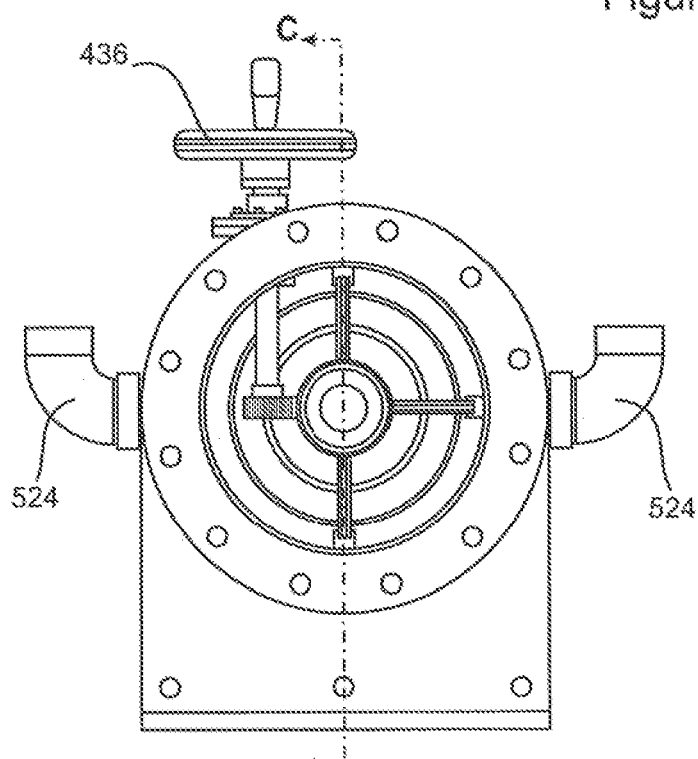
FIG. 15 is an end view of FIG. 14.

A booster assembly 512, according to a fifth embodiment of the present invention is shown in FIGS. 14 to 16. For convenience, features of the booster assembly 512 that are similar or correspond to features of the booster assembly of the first and fourth embodiments have been referenced with the same reference numerals.

The booster assembly 512 is adapted to be secured to an outlet of a turbine unit (not shown) or may be secured to another type of fluid motive mechanism that supplies a motive fluid force such as an impellor pump, an air pump or a combustion engine.

The booster assembly 512 comprises a booster apparatus 510 connected to a flow regulator 436 for regulating the flow characteristics of the fluid passing through the booster assembly 512. A valve head 438 has an enlarged end 447 which is adapted to co-operate with a converging nozzle 122 of the booster apparatus 510 to regulate the flow of fluid passing along the fluid path.

In this embodiment the booster apparatus 510 incorporates two inlets 523. Each inlet 523 is provided by a tube 524 which has a portion oriented perpendicular to the longitudinal extent of the booster apparatus 510. As best shown in FIG. 16, the inlet 523 extends passed the end of the converging nozzle 122.

The position of each inlet and the angular orientation of each tube is based on the required outcome of the booster assembly. However, an important consideration is that each inlet is located with the low pressure region created in the booster apparatus.

Figure 19:
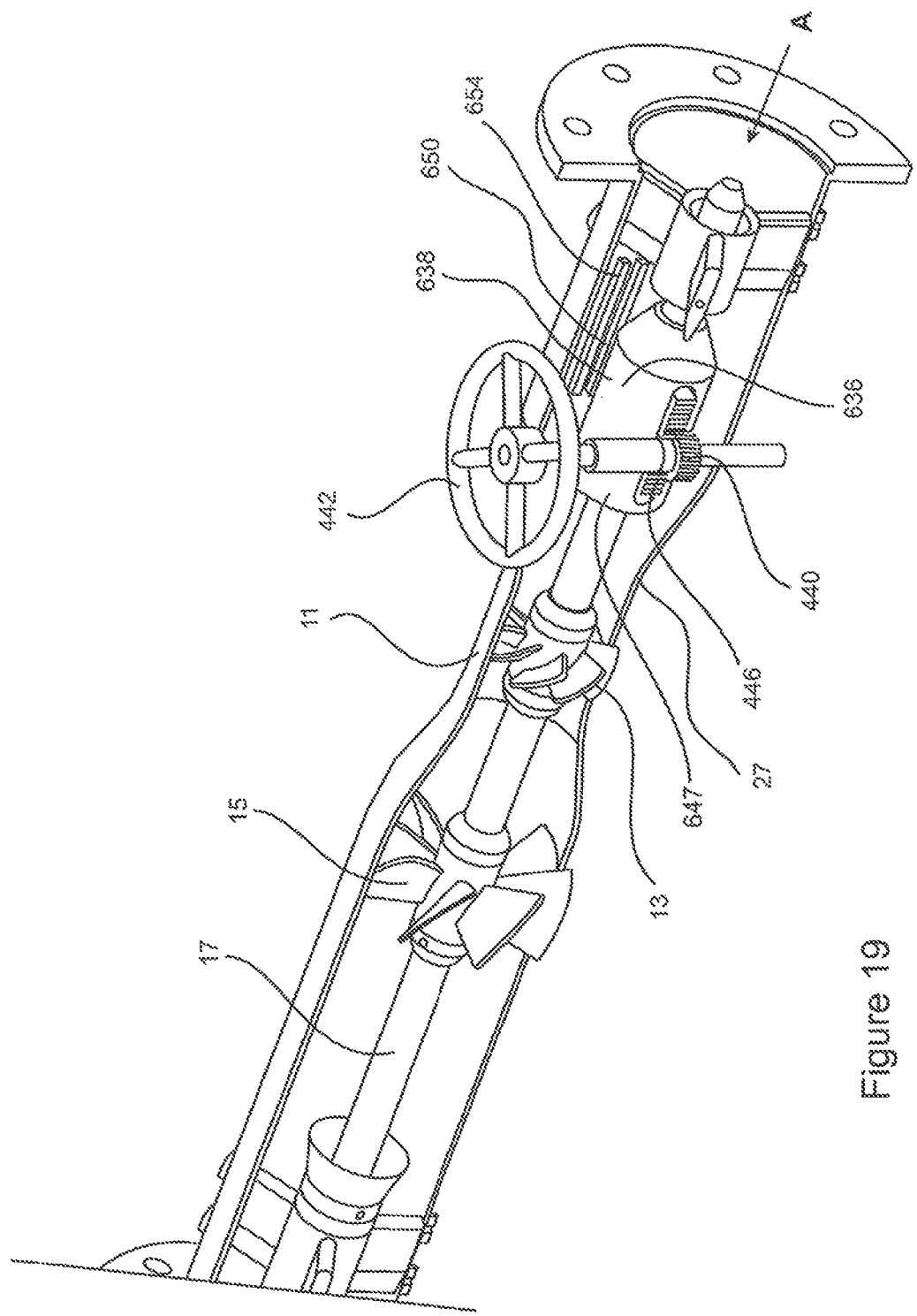
FIG. 19 is a perspective view of a flow regulator and a turbine unit of a booster assembly according to a sixth embodiment of the invention.

A booster assembly 612, according to a sixth embodiment of the present invention is shown in FIGS. 19 and 20. For convenience, features of the booster assembly 612 that are similar or correspond to features of the booster assembly of the first and fourth embodiments have been referenced with the same reference numerals.

The booster assembly 612 comprises a booster apparatus (not shown) connected to a turbine unit 11. While the booster apparatus is not shown in FIGS. 19 and 20, the booster apparatus may, for example, take the form of any of the booster apparatus as herein described.

The booster assembly 612 also comprises a flow regulator 636 for regulating the flow characteristics of the fluid passing through the booster assembly 612. The flow regulator 636 comprises a valve head 638 which is rotatably supported on a shaft 17 such that the valve head 638 is mounted in the fluid path. As shown in FIGS. 19 and 20 a drive turbine blade set 13 and pumping turbine blade set 15 of the turbine unit 11 are also mounted on the shaft 17.

The valve head 638 comprises a sleeve 644 which is supported by a fin 650 which extends radially outward from the sleeve 644. The end 652 of the fin 650 is received in guide tracks 654. The guide tracks 654 permit travel of the fin 650 along the longitudinal extent of the guide track 654.

The sleeve 644 also has an end 647 which co-operates with an inner surface of the nozzle 27 of the turbine unit 11 to control the cross sectional area of the fluid path to therefore control the flow of fluid through the booster assembly 612.

As would be readily understood by the person skilled in the art, the pipeline 112 may incorporate one or more booster assemblies' therealong.

The pipeline 112 may have a vent valve (not shown) at the elevated position 114. The vent valve vents gas as it separates from the water and collects at the elevated position.

In instances where the pipeline 112 continues to a lower position the water, minus the entrained air, can flow to the lower position under gravity. At that position a further pump and booster assembly (or just a booster assembly) may pump the fluid to the next elevated position, and so on until the final destination is reached.

The booster apparatus can be fitted to a pipeline having a gradient ranging between a continuous upward gradient (greater than 0.25%) up to a vertical gradient, as for example those used in multi-story buildings.

The booster assembly will have the capacity to pump fluid to a head which is directly proportional to the energy converted on to the shaft of the turbine unit.

Considering the turbine unit, the rotation of the pump turbine blade set allows for the induction of greater mass flow across the drive turbine blade set through the creation of a substantially lower pressure zone than would have been created in its absence.

The energy loss of the drive turbine blade set is compensated by the action of the pump turbine blade set since it is acting as a pump. Effectively the energy is transferred from the drive turbine blade set along the shaft to the pump turbine blade set. This is only possible when both blade sets are mounted on the same shaft, rotate simultaneously and are in reversed orientation such that the pump turbine blade set pulls the fluid through the turbine unit whilst the drive turbine blade set operates in a conventional manner.

The action of the pump turbine blade set creates a high pressure differential between the front of the drive turbine blade set and the rear of the pump turbine blade set. This differential induces a larger mass flow rate as fluid travels from a region of higher pressure (in front of drive turbine blade set) to a region of lower pressure (behind the pump turbine blade set). The higher pressure region could be caused by either natural (i.e. atmospheric pressure), or be forced (i.e. pumped or pressure head). The pump turbine blade set therefore induces increased mass flow and velocity of the fluid through the drive turbine blades. As a result of the action of the pump turbine blade set the velocity of the fluid passing through the turbine assembly increases (for water, from 3 m/sec to in excess of 35 m/sec) whereby the velocity of the fluid substantially exceeds that of its terminal velocity caused by gravity.

In addition, the pumping turbine blade set evacuates the fluid and at the same time removes the potential of back pressure and impediment to the fluid flow that would normally occur in front of the drive turbine blade set.

The diameter of the pumping turbine blade set relative to the diameter of the driving turbine blade set can be the same, smaller or larger, depending upon the required result as well as the conditions in which the turbine unit.

The common shaft may extend through the turbine housing and protrude therefrom to allow an alternator or motor to be connected thereto in order to generate electricity.

In some applications the turbine housing supports a convergent venturi. The convergent venturi provides a convergence area which increases the velocity of fluid due to the conservation of mass. The conservation of mass states that as a fluid body travels through a smaller area, its velocity increases and vice versa.

In some applications the turbine housing supports a divergent venturi. The divergent venturi provides a divergence area which decreases the velocity of fluid travelling there through.

The purpose of the convergent venturi immediately prior to the drive turbine blade set is to increase the velocity of the fluid to levels that exceed the terminal velocity of the fluid cause by gravity (for water this is approximately 7 m/sec). This facilitates maximum extraction of kinetic energy from the moving fluid.

The portion of the turbine housing in which the pump turbine is located may also include a divergent venturi. This portion of turbine housing may diverge away from the drive turbine blade set to the pump turbine blade set, may be the same size between the two turbine blade sets, or may converge from the drive turbine blade set to the pump turbine blade set.

Modifications and variations such as would be apparent to the skilled addressee are considered to fall within the scope of the present invention.

Reference to positional descriptions, such as lower and upper, are to be taken in context of the embodiments depicted in the figures, and are not to be taken as limiting the invention to the literal interpretation of the term but rather as would be understood by the skilled addressee.

Throughout the specification, unless the context requires otherwise, the word "comprise" or variations such as "comprises" or "comprising", will be understood to imply the inclusion of a stated integer or group of integers but not the exclusion of any other integer or group of integers.

The invention claimed is:

1. A booster assembly comprising at least one turbine unit and at least one booster apparatus, the booster apparatus having at least one inlet through which a first fluid passes, the booster apparatus comprises a booster housing adapted to be connected to an outlet of a turbine unit of the at least one turbine unit whereby a second fluid passes along a fluid path extending through the turbine unit and passing into the booster housing, the at least one turbine unit comprising one or more drive turbine blade sets located upstream from one or more pump turbine blade sets mounted within a passage of a turbine housing, the one or more drive turbine blade sets and the one or more pump turbine blade sets are mounted on a common shaft such that the one or more drive turbine blade sets and the one or more pump turbine blade sets are confined to rotate in the same direction and same speed, wherein the first fluid passes through the at least one inlet to be entrained in the second fluid as the second fluid is flowing through the booster housing, the booster assembly further comprising a flow regulator for regulating the volume and velocity of the second fluid passing through the booster assembly, the flow regulator comprises a valve head adapted to be variably positioned along the fluid path, the valve head is supported on the common shaft, wherein the common shaft is rotatable relative to the valve head.

2. The booster assembly according to claim 1 wherein the flow regulator is positioned adjacent the inlet of the at least one turbine unit.

3. The booster apparatus according to claim 1 wherein the fluid path incorporates a portion having a reduced diameter.

4. The booster assembly according to claim 3 wherein the valve head is variably positioned with respect to the reduced portion to regulate the flow of the second fluid along the fluid path.

5. The booster assembly according to claim 1 wherein the flow regulator is positioned upstream of the at least one turbine unit.

6. The booster assembly according to claim 1 wherein the flow regulator is positioned between the at least one turbine unit and the at least one booster apparatus.

7. The booster assembly according to claim 3 wherein the valve head has a surface which complements the shape of the portion having a reduced diameter.

8. The booster assembly according to claim 1 wherein the valve head is manually positioned by an adjustment device located external of the fluid path, the adjustment device operatively engages the valve head through a rack and pinion arrangement.

9. The booster assembly according to claim 1 wherein the valve head is positioned remotely by a control centre.

10. The booster assembly according to claim 1 wherein the valve head is positioned automatically based on the flow requirements of the second fluid passing therethrough wherein a system for automatically positioning the valve head incorporates one or more sensors to measure characteristics of the fluid flow.

11. The booster assembly according to claim 1 wherein the valve head comprises an enlarged portion located at an end of a sleeve.

12. The booster assembly according to claim 1 wherein the booster apparatus is configured such that when the second fluid is passing therethrough a lower pressure region is formed in the booster apparatus, the lower pressure region being lower than the pressure of the first fluid before it enters the booster apparatus.

13. The booster assembly according to claim 1 wherein the first fluid is induced to flow through the at least one inlet into the booster housing to be entrained in the second fluid.

14. The booster assembly according to claim 12 wherein the booster apparatus comprises a reducing nozzle, wherein the reducing nozzle is configured such that when the second fluid flows therethrough the lower pressure region is created within the booster housing.

15. The booster assembly according to claim 12 wherein the lower pressure region in the booster housing is in fluid communication with the at least one inlet such that the first fluid is induced to flow through the at least one inlet into the booster housing, to be mixed with the second fluid flowing through the booster housing.

16. The booster assembly according to claim 1 wherein the drive turbine blade set and pump turbine blade set are rotatably fixed and the turbine housing rotates therearound.

17. The booster assembly according to claim 1 wherein the drive turbine blade set and pump turbine blade set are mounted in opposed relation whereby the pump turbine blade set is in reverse relation to the drive turbine blade set such that in operation a region between the drive and pump turbine blade set is created having a pressure which is lower than the pressure of the fluid supplied to the turbine unit.

18. A pipeline comprising at least one booster assembly according to claim 1.

* * * * *